United States Patent [19]

Pavan

[11] 4,117,787

[45] Oct. 3, 1978

[54] MACHINE FOR PERFORMING CULTIVATION UNDER PLASTICS

[76] Inventor: Jean-Paul Pavan, Monheurt Damazan, France

[21] Appl. No.: 778,426

[22] Filed: Mar. 17, 1977

[30] Foreign Application Priority Data

Sep. 20, 1976 [FR] France .................. 76 28212
Feb. 24, 1977 [FR] France .................. 77 05441

[51] Int. Cl.$^2$ .......................................... A01C 11/00
[52] U.S. Cl. ................................... 111/2; 47/9
[58] Field of Search ............................. 111/1–3; 47/9

[56] References Cited

U.S. PATENT DOCUMENTS

| | | | |
|---|---|---|---|
| 1,562,353 | 11/1925 | McGuire et al. | 47/9 |
| 2,708,812 | 5/1955 | Nakai | 47/9 |
| 3,161,163 | 12/1964 | Cosner et al. | 111/3 |
| 3,176,635 | 4/1965 | Mabon | 111/3 |
| 3,184,889 | 5/1965 | Gray et al. | 47/9 |
| 3,234,691 | 2/1966 | Cowell | 47/9 |
| 3,559,599 | 2/1971 | Hoadley | 111/1 |

Primary Examiner—Robert E. Bagwill
Attorney, Agent, or Firm—Mason, Kolehmainen, Rathburn & Wyss

[57] ABSTRACT

The invention provides a machine for performing cultivation under plastics, wherein there is a framework, a ploughshare to make a furrow in the ground, a support bearing a roll of plastic sheet and arranged in such a way that the sheet is positioned on the ground above the furrow, means for perforating the sheet before positioning same on the ground, perforations being made in the sheet vertical to the burrow.

17 Claims, 12 Drawing Figures

MACHINE FOR PERFORMING CULTIVATION UNDER PLASTICS

The invention provides a machine for performing cultivation under plastics.

For the time being, when it is sought to perform cultivation under plastics or stratified cultivation, a sheet of plastic material is positioned on the rows of seedlings so that they may grow normally without the fruits subsequently produced by said seedlings being spoiled by the earth.

Such a type of stratified cultivation is thus used for growing egg-plants, Jamaica pepper, melons, tomatoes, etc...

However, it takes a long time to work out this known process and the seedlings run the risk of being spoiled when apertures are made in the plastic sheet.

Furthermore, when the plastic sheet is positioned on a row of seedlings, the latter are more or less crushed thereby.

According to a further process, it is provided to unroll the plastic sheet on the ground, then to make perforations in said sheet, which are achieved by hand with a heating element.

Afterwards, a hole is to be made into the ground by means of a dibble, the seedlings put into said hole, then the earth must be tamped around said seedlings.

Such operations are also delicate and take a long time to be performed in view of the fact that they must be made by hand through a perforation in the plastic sheet and that in fact they require three distinct operations, one for unrolling the sheet, another for making perforations in said sheet and finally a third one for setting the seedings.

Also, all said known processes show the drawback not to ensure the achievement of regular settings in depth and regular spaces between the seedlings, because they depend on the skilfulness of the operator.

The present invention is particularly aimed to remedy these drawbacks and to this end provides a machine for performing cultivation under plastics, wherein there is, on a framework, a ploughshare to make a furrow in the ground, a support bearing a roll of plastic sheet and positioned in such a way that the sheet is arranged on the ground above the furrow, means for perforating said sheet before it is positioned on the ground, the perforations being made in the sheet vertical to the furrow.

According to a further characteristic of the invention, the machine carries a seat for an operator and a tongue to secure the seedlings into the furrow, said tongue being fixed on the framework under the sheet in process of unrolling.

According to another characteristic of the invention, the means for perforating the sheet are connected to wheels supporting the machine so as to be driven.

According to a further characteristic of the invention, the machine carries means for achieving two rows of perforations in the sheet, said means being operated from the supporting wheels and actuated in turn so as to achieve offset rows of perforations.

The invention is represented by way of non-limitative example in the attached drawings, wherein:

FIG. 5 is a diagrammatical lateral view of another mode of embodiment of the invention.

FIG. 9 is an enlarged and part cross-section view along A—A of FIG. 5.

Accordingly, the present invention is aimed to achieve a machine enabling a process whereby seedlings are placed rapidly in the earth when stratified cultivation is performed and then to improve the output and cost price per hectare of such a type of cultivation.

Furthermore, the machine provided by the invention makes it possible to put seedlings in the earth without running the risk of spoil them, the ground being worked (making out the furrow and covering the latter with earth) under the plastic sheet positioned thereon.

Also, the machine provided by the invention makes it possible to achieve regular plantings as regards the depth of placement of the seedlings in the earth, as well as the space between said seedlings, said regularity in planting enabling to arrange them in quincunx from one row to another, and then to increase the surface utilizable for their growth.

Figure 1:
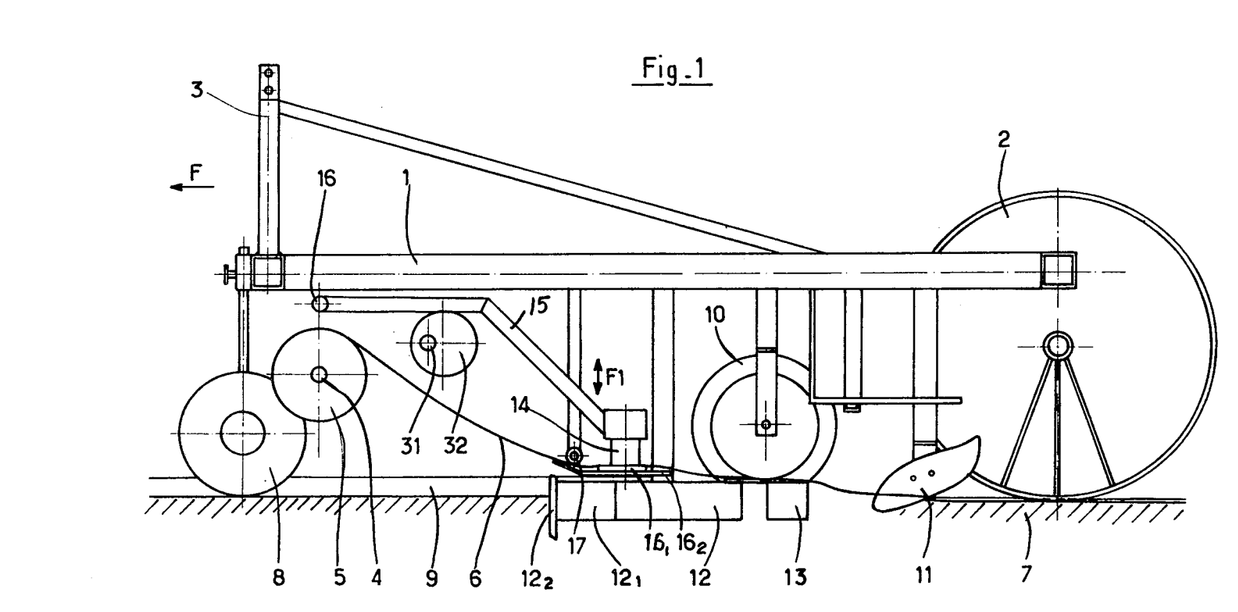
FIG. 1 is a longitudinal cross-section view of the machine according to the invention.
Figure 2:
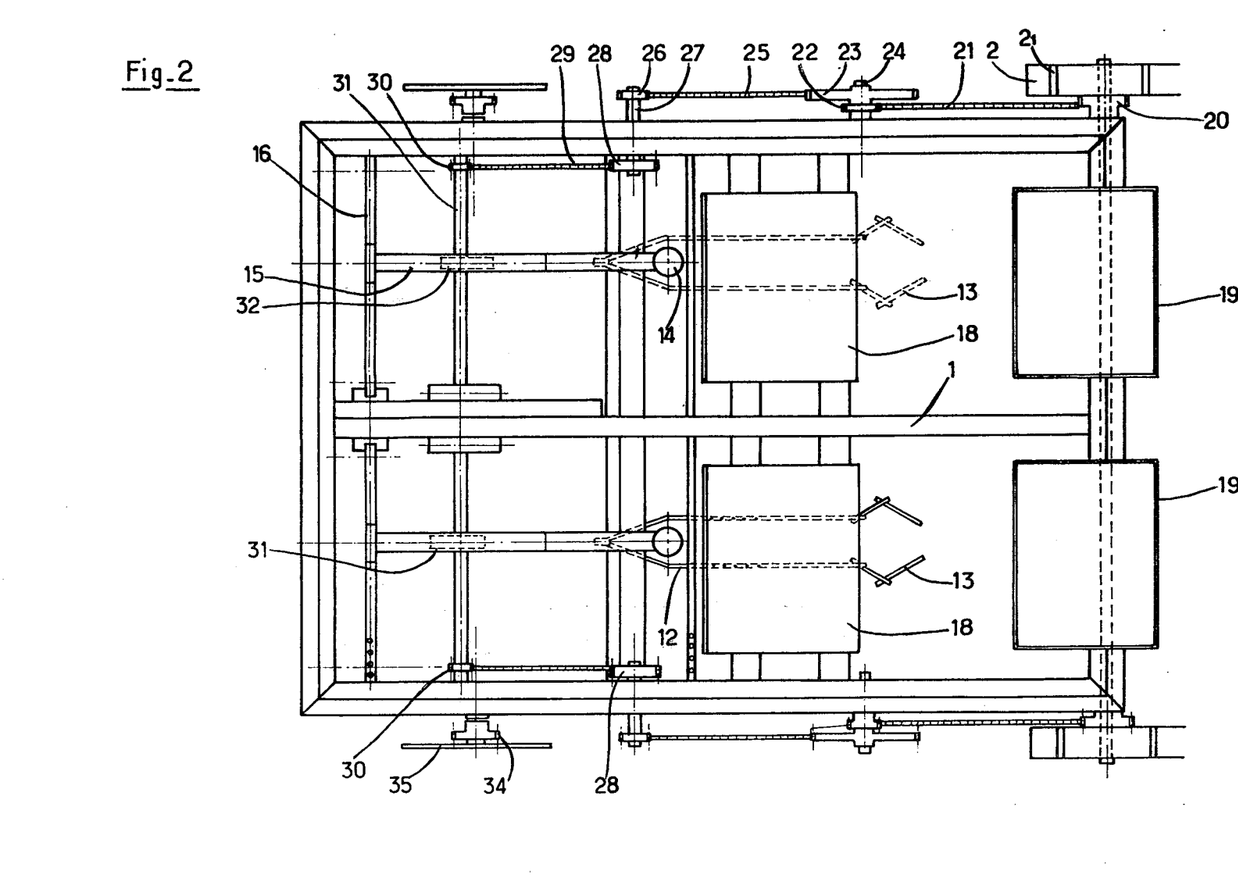
FIG. 2 is a view from above of FIG. 1.

The machine consists of a framework carrying a frame 1 whose rear end is supported by side wheels 2.

The front end of said framework is coupled by arms 3 on to the tug-hook 3 of a tractor.

The framework is first achieved so as to lay down a sheet of plastic on the ground, while it is drawn by the tractor.

To this end, the framework carries an axis 4 around which a roll 5 of a sheet 6 is arranged, said roll of plastics being laid down on the ground 7.

Ahead of the roll 5, in the forwarding motion direction of the machine in the direction of arrow F, two discs 8 remote from each other by a width corresponding to the width of the plastic sheet 6 are positioned, said discs making the furrows 9 in the ground.

Beneath the framework 1, and after the sheet is laid down on the ground, wheels 10 are arranged substantially in the same line as the discs 8, said wheels being provided to apply the edges of the plastic sheet on to the ground so as to keep it in position, preventing any sliding thereof on the ground and ensure the normal unrolling of the roll of plastic material when the machine moves forward.

Behind the wheels 10, with respect to the forward motion direction of the machine, covering ploughshares 11 are provided which close the furrow 9 made by the discs 8 by covering with earth the edges of the plastic sheet 6 embedded into said lateral furrows.

In accordance with the invention, this machine also carries means which simultaneously ensure when the plastic sheet is laid down on the ground the formation of a furrow in the ground and closing of said furrow after the seedling is put in the earth, said formation and closing of the furrow being performed under the plastic sheet without any intervening whatever, so that it may be possible to put the seedling in the earth before the furrow is closed and through the perforations made in the plastic sheet vertical to the furrow.

Beneath the framework 1 a ploughshare 12 is thus secured, having a V-shaped front end $12_1$, with a coulter $12_2$ at the point.

Behind said ploughshare, tongues 13 inclined in relation to the forward motion of the machine are provided, the purpose of which is to close the furrow after the seedling is put in earth.

The plastic sheet 6 is shaped by a hollow punch 14 secured to the end of an arm 15 mounted pivoting at 16 on the framework of the machine.

This hollow punch 14 which is vertically movable in the direction of arrow F1, regularly strikes a supporting plate $15_1$, preferably made of wood, itself secured to a supporting plate of steel $16_1$, cross-wise secured under the framework 1 of the machine.

The plastic sheet 6 which unrolls from the roll 5, first passes under a small roll 17 which freely turns about its axis and guides the plastic sheet so as to position it substantially on a level with the upper surface of the supporting plate 15..

Thus, when the machine moves forward, the plastic sheet is applied against the ground by the wheels 10 and freely unrolls from the roll 5 by being guided by the roll 17 in such a way that the hollow punch 14, when striking the supporting plate $15_1$, achieves perforations designed to leave passage to the seedlings.

Said perforations are made in the sheet 6 along the axis of the furrow made by the ploughshare 12, so that an operator sitting on the seat 18 of the framework might pick up the seedlings out of a container 19 and position them in said furrow made by the ploughshare 12 by passing them through the apertures of the sheet 6, and this just before the tongues 13 close the furrow beneath the sheet 6.

Thus, the operator sitting on the machine has just to present the seedling through the aperture made in the sheet and to hold it in this position for a little while until the earth turned down by the tongues 13 closes the furrow and sets the seedling in position.

As the seedling is embedded in a furrow made by the ploughshare 12 whose depth is constant, said seedling is then positioned at a constant depth which is determined so as to be more suitable to the growing of the seedling.

The hollow punch 14 is actuated from the wheels 2 of the machine which carry clamps $2_1$ in order to prevent the wheels from sliding on the ground.

The wheels 2 are integral with a pinion 20 which drives, through a chain 21, two other pinions 22 and 23 coaxially mounted about axles 24.

Said pinions 23 drive in turn, through claims 25, pinions 26 fitted about axles 27. These axles 27 carry a second pinion 28 which finally drive through chains 29 and pinions 30, a transversal axle 31 along which cams 32 are fitted.

The cams 32 support the arms 15 which pivot at 16 and which in turn support the hollow punches 14 at their free ends.

The shaft 31 also carries pinions 33 at its free outer ends which pinions engage pinions 34 integral with discs 35.

Figure 3:
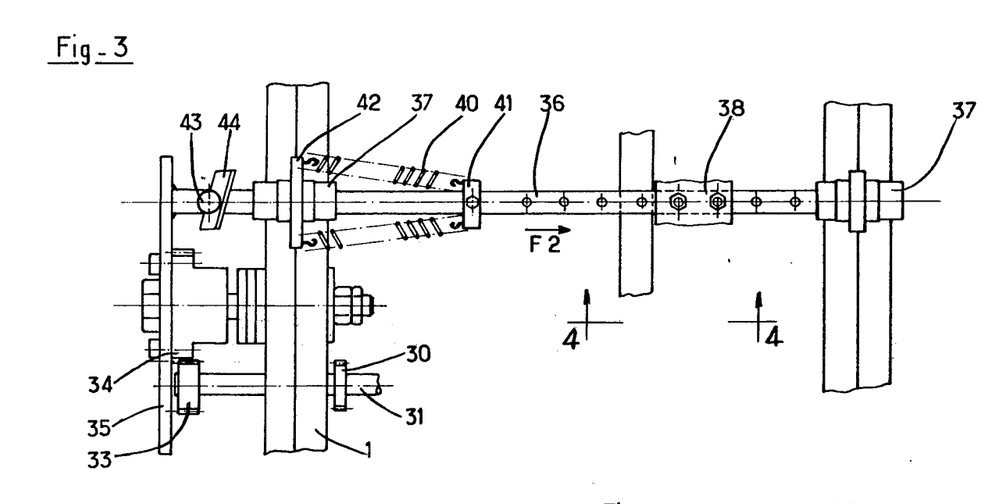
FIG. 3 is a part view from above showing the operating mechanism of the hollow punch.
Figure 4:
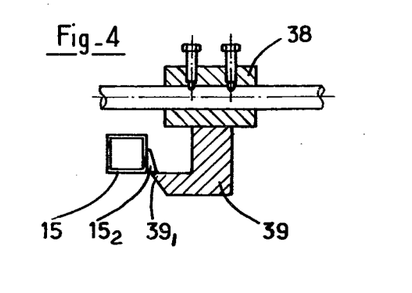
FIG. 4 is a view along lines 4—4 of FIG. 3.

Also, a transverse shaft 36 is provided on the framework 1 of the machine (See FIG. 3), axially movable about bearings 37, said shaft 36 receiving an adjustable support 38 for a hook 39 (See FIG. 4).

The hook 39 is positioned on the axle 36 in such a way that its end $39_1$ may engage under a finger $15_2$ of the arm of the lever 15 when the latter is lifted by the cam 32.

Thus, when the cam lifts up the arm 15 and the hollow punch 14, the latter is held in a high position by the hook 39 until the axle 36 is axially removed in the direction of arrow F2 against the return-springs 40 connecting a ring 41 on said axle 36 to a coupling piece 42 on the frame 1.

The axial motion of the axis 36 is obtained through a can 43 made on one of the lateral surfaces of the disc 35, in contact with an inclined plane 44 provided at the end of the axle 36 so that said inclined plane 44 acts like a cam follower under the action of the cam 43 to axially move, in the direction of arrow F2, the axle 36 and thus generate the release of the lever 15.

According to the dispositions provided by the invention, separate means are then used to, on the one hand, generate the lifting of the hollow punch and, on the other, the downward motion thereof, these two motions being operated in synchronism with the moving speed of the machine so that the spaces between the perforations are rigorously constant.

In addition, said two operating means for the hollow punch make it possible the sudden downwards motion of the latter by actuating the hook 39 so that it cuts the sheet, the time when said lever 15 is released and then the sheet cut being however determined with accuracy depending on the angular position of the cam 32, in such a way that said cam 32 starts lifting up the arm 15 just after the sheet is cut, which provides the latter from being carried along or torn by the hollow punch in view of the relative motion of the sheet and the machine.

As shown in FIG. 2, it will be possible to provide the machine with several hollow punches and thus, for example, with two of them so as to simultaneously achieve two rows of planting.

However, the hollow punches being operated with precision in function of the moving speed of the machine, it is possible to angularly offset the cams 32 of the two lever arms 15, in such a way that the hollow punches 14 are actuated in turn and that the perforations of the seedling rows are offset in relation to each other.

Such an arrangement then makes it possible to increase the surface available for each seedling, either as regards the earth surface or insulation in order to improve the possibilities of growing.

In the examples shown in the attached drawings, the machine according to the invention is designed to perform cultivation from seedlings, but it will also be possible to design it to cultivation from seeds by providing a distributing device ensuring the distribution of said seeds in the furrow made beneath the perforated plastic sheet, said seeds being laid down either prior to or after the furrow is covered by the sheet.

In the mode of embodiment shown in FIG. 5, the machine carries a framework 1 carrying rear side wheels 2, a front coupling arm 3 and an axis 4 about which a roll 5 of plastic material sheet 6 is arranged, which is to be laid down on the ground 7.

Also, at its front portion the framework 1 carries two side discs 8 which make furrows 9 in the ground, wherein the edges of the sheet 6 are embedded, the edges of said sheet being maintained without slipping on the ground when unrolling is performed by the side wheels 10 while ploughshares 11 are provided to cover the edges of the sheet laid down with earth.

Also, this machine carries a ploughshare 12 whose front end is V-shaped and carries a coulter $12_2$ while the rear end thereof carries tongues 13 designed to close the furrows made by the ploughshare 12 behind the seedlings formerly laid down in the furrow through the perforations made in the sheet 6 by the hollow punch 14.

The hollow punch 14 perforates the sheet 6 which unrolls above a matrix $16_3$, preferably made of teflon, itself resting on a support $16_1$.

This hollow punch is designed to perforate the sheet through a sudden motion and to quickly move upwards so as to reach its former position in order not to prevent the sheet from freely unrolling.

The hollow punch 14 carries (See FIG. 6) a box 50, secured to the framework 1 through a tongue 51 and bolts which clamp the box 50 on to a transversal profile $1_1$ of the framework 1.

Figure 6:
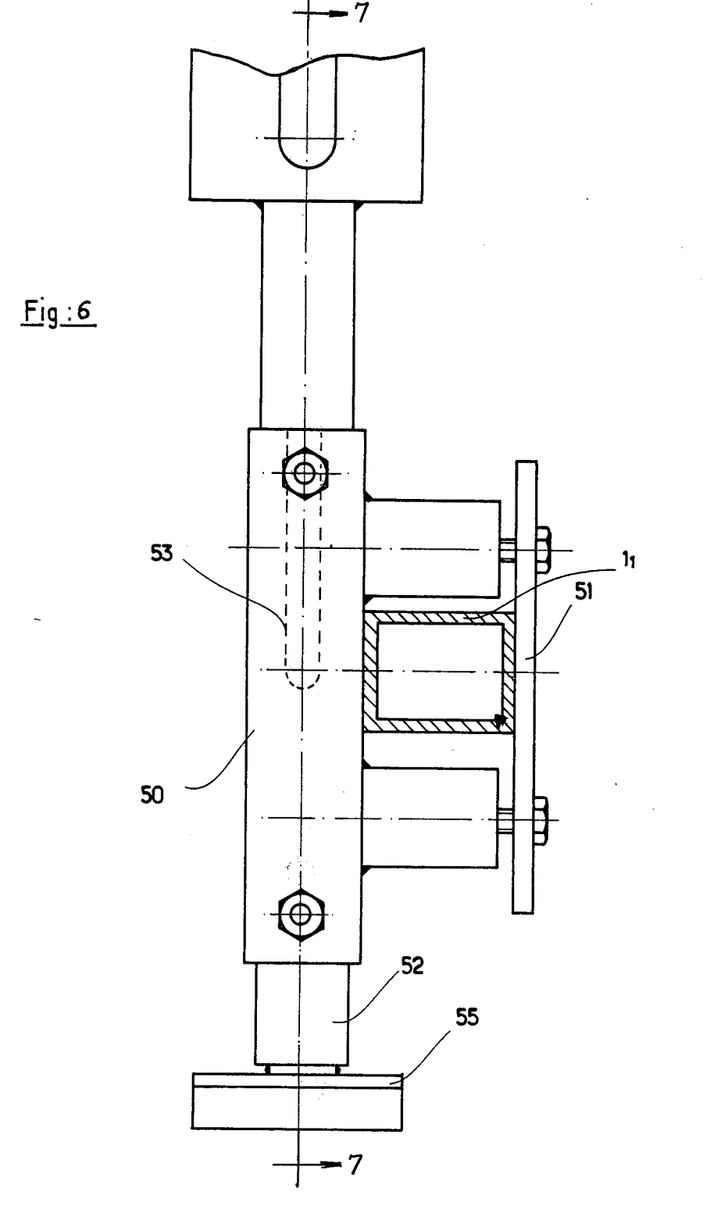
FIG. 6 is a side view of the device for perforating the sheet.

Inside said box 50 a casing 52 carrying slits 53 opposite to each other is provided.

Inside said casing a chuck 54 is mounted sliding which receives the hollow punch 55 at its lower end.

Also, the chuck 54 carries two lengthened apertures 56 diametrally opposed to each other which receive an axle 57.

Said axle 57 also passes through slits 53 and ends are connected to springs 58 which are coupled to bolts 59 welded to the casing 52.

Also, the axle 57 is connected to one of the ends of a spring 60 whose other end is coupled at 61 to a rod cross-wise arranged inside the chuck 54. Said spring 60 makes with the springs 58 a resilient fitting of the chuck 54 along the axis.

In the example represented, the sliding motion of the chuck 54 which supports the hollow punch 55 is obtained from a cam 32 fitted on to the shaft 31 of the machine. However, many further operating devices can be adopted and in particular a hydraulic or pneumatic device fed by the power of a tractor to ensure the lifting up of the punch can be provided.

The cam 32 co-operates during its rotation with a roller 61 rotatable mounted on a square piece 62, integral with a plate 63 secured to the end of the chuck 54.

Said plate 63 is provided with an aperture 64 through which the axle 31 passes.

This plate 63 carries at its upper and a finger $64_1$ ending in an inclined end and likely to come in position above the hook 65.

Said hook 65 is movable according to the direction of arrow F2 depending on the traveling of the carriage so as to release the finger 64.

When this has been performed, the springs 58 extend and suddenly apply the hollow punch 55 against the sheet 6 resting on the matrix $16_2$, which results in the perforation of said sheet.

When the sudden downwards motion of the chuck 54 of the hollow punch is performed, the kinetic energy it acquires results in putting the spring 60 under tension, while the axle 57 moves back within the lenghtened apertures 56.

Figure 7:
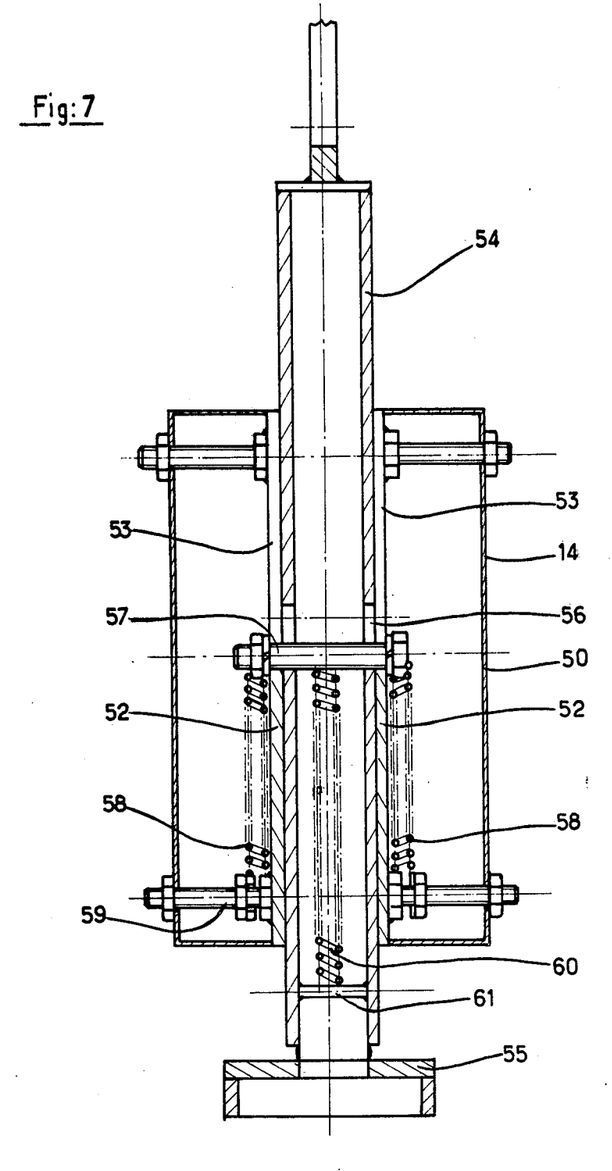
FIG. 7 is a cross-section view along lines 7—7 of FIG. 6.
Figure 8:
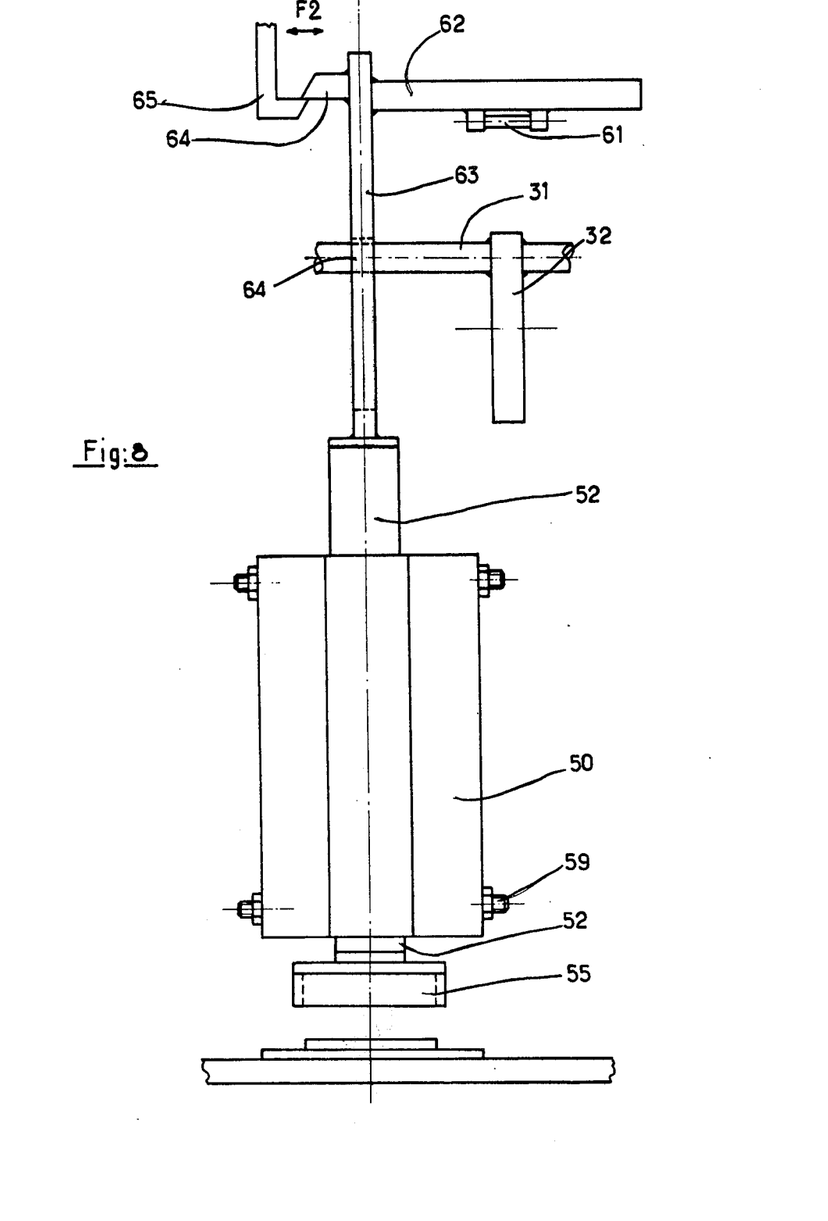
FIG. 8 is a view from the left-hand portion of FIG. 2, associated with the operating mechanism of the perforating device.

It results from such an arrangement that, when the axle 57 comes to abutment against the lower ends of the slits 53, the chuck 54 continues its motion so as to perforate the sheet 6 then, when this has been performed, the spring 60 suddenly brings back the chuck 54 into the position shown in FIG. 7, which makes it possible to perforate the sheet 6 despite the fact that the latter unrolls continuously.

The device for releasing the hollow punch can also be connected to a seeder or planting device secured to the framework so as to operate, in such a mode of embodiment, the distribution of seeds or plants in synchronism with the traveling of the machine and then of that of the perforations made in the sheet so that said products are sown or planted vertical in relation to the perforations.

Furthermore, in the example shown, the hollow punch 55 and the chuck 54 thereof are operated in synchronism with the traveling of the machine by means of a device with hooks. However, many other devices can be adopted and, for example, the hollow punch or hollow punches can be radially secured onto a horizontal cross-wise axle driven in rotation through pinions with a suitable stepping down by the wheels 2 of the machine. This cross-wise axle can also be replaced by a drum 31 carrying peripheral hollow punches mounted resiliently, said drum resiliently applying in that case the sheet against a counter-roller $16_4$ so as to drive the sheet at the same time it is perforated.

Also, the machine provided by the invention carries at its rear end arrangements ensuring the positioning of the plastic sheet on the ground further to planting, without so far running the risk to spoil said plantings.

Said arrangements carry movable means ensuring the tamping of the earth around the seedlings put into the ground, said tamping being also performed by applying a pressure on the upper surface of the plastic sheet.

Figure 10:
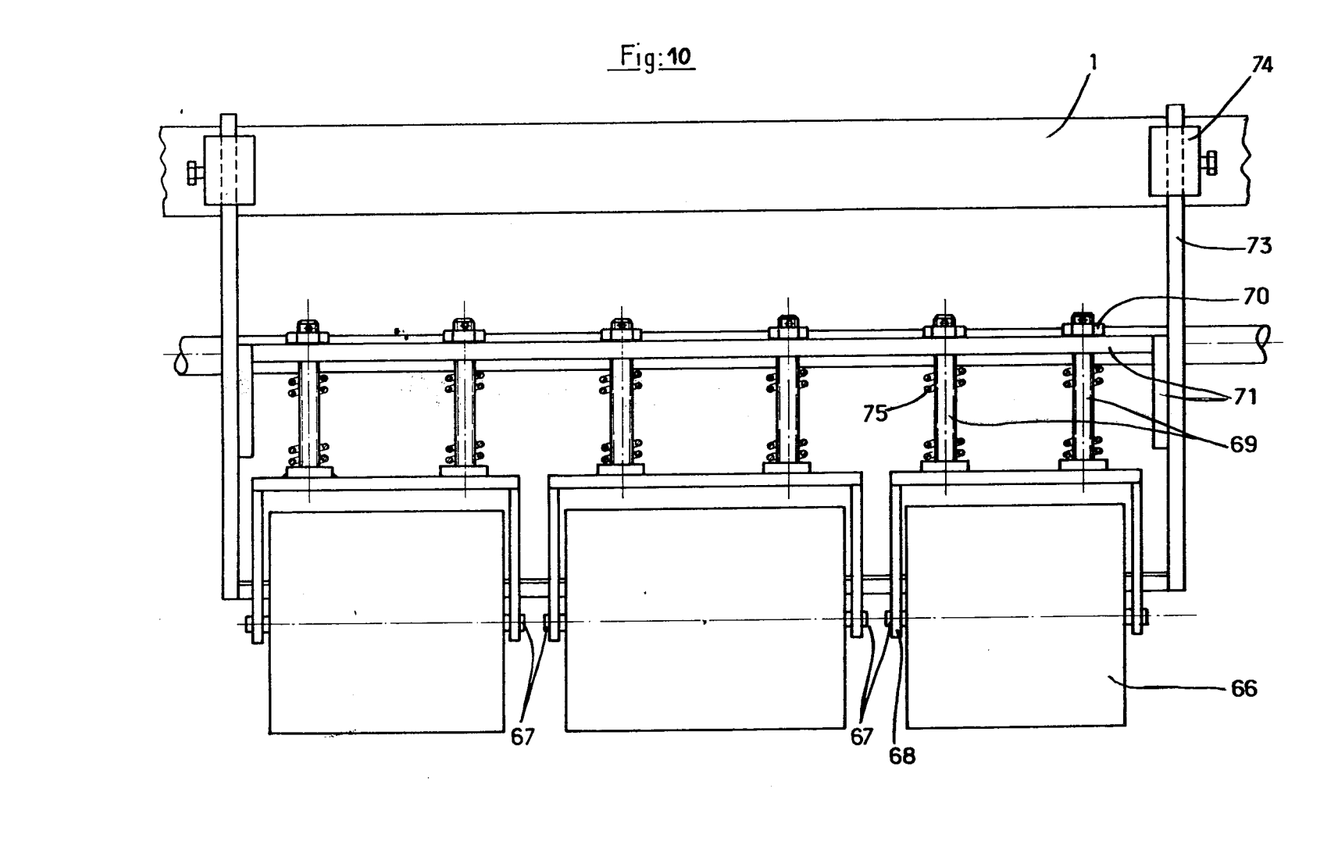
FIG. 10 is a view of the rear part of the machine particularly showing the fitting of the rolls, the driving wheels being removed.

Thus, as shown in FIG. 10, the framework 1 carries rollers 66 the number of which equals that of the ploughshares 12 + 1, said rollers being slightly remote from each other (See particularly FIG. 10), so that they apply against the plastic sheet 6 at each side of the line of the perforations made in the sheet and through which the seedlings sown pass.

The axles 67 of said rollers 66 are mounted rotating onto supporting stirrups 68, said stirrups themselves being supported through rods 69 held up by nuts 70 onto a bent U-shaped stirrup 71 secured at 72 to suspending side arms 73.

Said side arms are fitted adjustable through sliding inside casings 74 of the framework 1.

About the rods 69, connecting the stirrup 68 to the stirrup 71, springs 75 are arranged, which are designed to resiliently apply the rollers 66 against the sheet resting on the ground.

Also, the stirrup 68 carries extensions 76 which are fitted pivoting about an axle 77 positioned parallel to the axles 67 of the rollers 66.

Said axles 67 are fitted to the supporting rods 73 and then make it possible for the rollers 66 to pivot in the direction of arrow F, whose pressure on the sheet is regulated by the springs 75.

Behind the rollers 66, in the forward motion direction of the machine, as many pairs of wheels 78 as ploughshares 12 are provided, said pairs of wheels each aligned on opposite sides of a line of perforations of the sheet 6 and being designed to tamp the earth about the plant introduced into the ground by exerting a pressure on to the ground through the plastic sheet.

Said pairs of wheels 78 are supported by stirrups 79 whereon pairs of arms 80 mounted pivoting at 81 about a cross-wise axle 82 are fitted.

The upper horizontal arm 79₁ of the stirrup 79 carries a rod 83 about which discs 84 are slipped, whose total weight determines the force of pressure of the wheels 78 onto the plastic sheet and then the force of tamping of the earth about the seedlings.

The two side rods 73 supporting the rollers 66 and the wheels 78 are connected at their basis by a profile 85 serving as a foot-rest for the operator sitting at 18 and who puts the seedlings into the furrows made by the ploughshare 12.

Figures 11, 12:
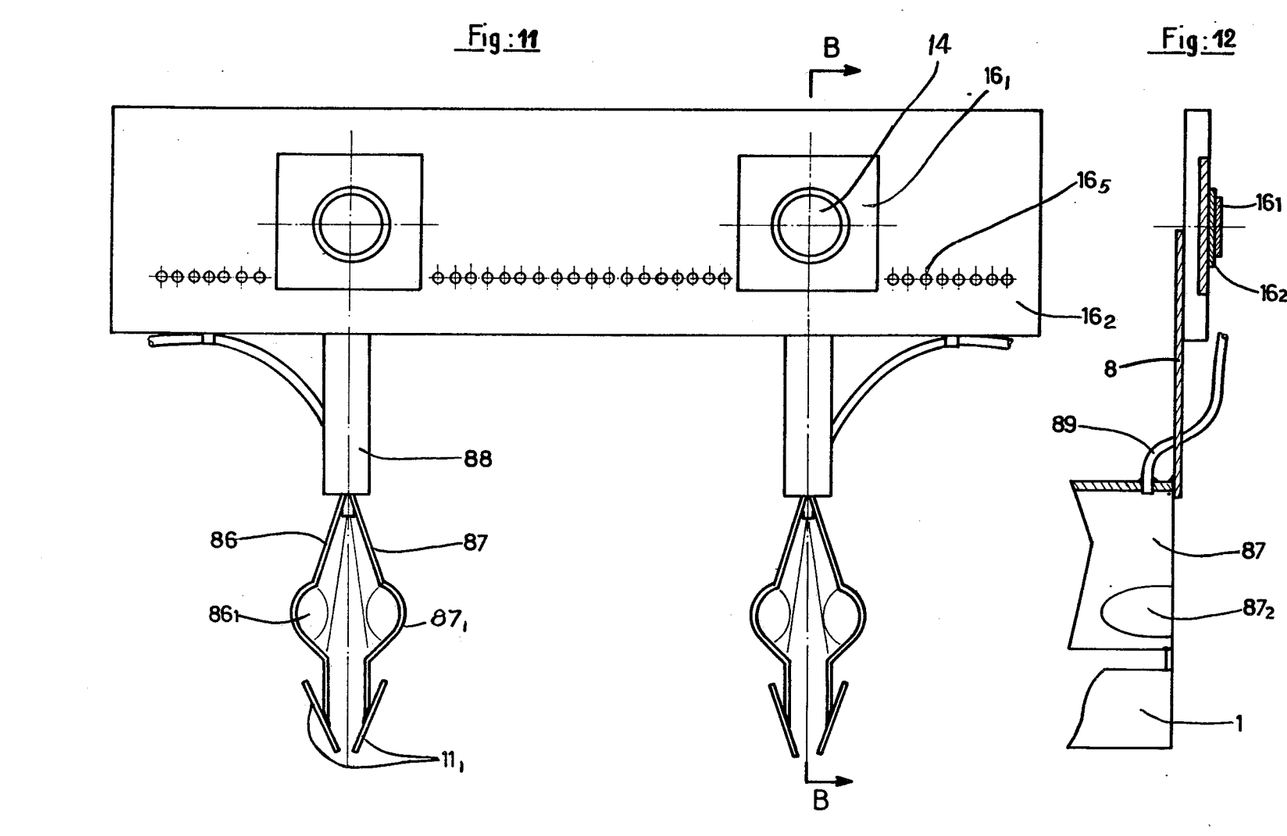
FIG. 11 is a view from above of a further mode of embodiment of the ploughshare of the machine.
FIG. 12 is a cross-section view along B—B of FIG. 11.

Another mode of embodiment of said ploughshare is shown in FIGS. 11 and 12, the two blades 86 and 87 of which are V-shaped arranged, have local deformations at 86₁ and 87₁ designed to enable the operator to introduce the seedling into the bottom of the furrow made by said two blades 86 and 87 of the ploughshare.

Thus, as shown in FIG. 11, each of the blades 86 and 87 carry on its surfaces opposite to each other concave deformations defining a cup between them permitting to introduce the hand therein.

The free end of said two blades 86 and 87 are extended with pallets 11₁ mounted adjustable so as to make it possible to adjust the reversing of the earth when the furrow made is closed.

As it can be seen in FIGS. 6 and 7, the blades 86 and 87 are secured to the end of profiles 88 positioned under the cross-wise plate 16₁ on the matrix 16₂ made of polyetrafluorethylene co-operating with the hollow punch 14 (See FIG. 1). Said matrixes 16₂, as it can be noticed from FIG. 11, support plates 16₂ which can be laterally adjusted by a set of perforations 16₅ so as to exactly adapt the position to that of the hollow punch 14 and the ploughshares 12.

Also, in order to favor the growing of the plant or the germinazing of the seeds put into the furrow made by the ploughshare 12, the machine carries means for watering the furrow. Said means consist of a water tank (non-shown) secured to the framework 1 of the machine and connected to pipes passing beneath the plastic sheet 6 and discharging at 89 between the two blades 86 and 87 of the ploughshare.

Of course, the invention is not limited to the examples of embodiment described and depicted hereabove, from which other variants can be provided without thereby departing from the scope of the invention. In particular, in the example shown in the drawings, the roll 5 of the plastic sheet is arranged upstream of the ploughshares 11 and 12 in the forwarding motion direction of the machine. It will however be clearly understood that the roll can be positioned at any place whatever and even behind the ploughshares so as to unroll the sheet while the seedlings or seeds are introduced into the furrows. Of course, in such a case, the perforations of the sheet are positioned on the ground vertical to the plantings, said unrolling and perforating operations being performed in synchronism with the forward motion of the machine.

What we claim is:

1. A machine for performing cultivation under plastics, comprising a framework, wheels for supporting said framework for rolling movement over the ground, a ploughshare supported on said framework to make a furrow in the ground, an axle supporting a roll of plastic sheet on said framework arranged to dispense said sheet toward the ground above the furrow, means supported from said framework for perforating the sheet before it reaches the ground, perforations being made in the sheet vertical to the furrow, a seat for an operator on said framework and a clamping tongue for clamping a seedling in the furrow, said tongue being secured to said framework beneath the sheet as it is dispensed onto the ground.

2. A machine according to claim 1, wherein said means for perforating the sheet is drivingly connected to said wheels which support said framework for the driving motion thereof.

3. A machine according to claim 2, including means for performing two rows of perforations in the sheet, said means being drivingly interconnected with said supporting wheels and actuated in turn for making offset rows of perforations.

4. A machine according to claim 2, wherein the means for perforating the sheet comprises a hollow punch and spring means biasing the hollow punch along an axis to perforate said sheet.

5. A machine according to claim 4, including a support for mounting said hollow punch for sliding movement, and a release spring for biasing said punch away from said sheet after perforation thereof.

6. A machine according to claim 5, wherein the hollow punch and support include longitudinal slots, an axle extending transversely through said slots, said axle being connected to the hollow punch, on the one hand, and on the other hand, to the support through said release spring.

7. A machine according to claim 4, including rollers positioned at the rear of the framework to roll in alignment with the direction of the forward motion of the machine, said rollers applying downward pressure against the sheet laid down on the ground on opposite sides of the lines of perforations of the sheet.

8. A machine according to claim 7, including means for supporting said rollers to pivot about an axis parallel to the axis of rotation thereof.

9. A machine according to claim 7, including springs for biasing said rollers to apply pressure against the sheet onto the ground.

10. A machine according to claim 4, including a plurality of rollers adjacent a rear portion of the framework aligned to roll in the direction of the forward motion of the machine, said rollers supported to tamp the earth on opposite sides of the lines of the perforations in said sheet and pressing against the sheet resting on the ground.

11. A machine according to claim 10, including means supporting said rollers in pairs about a common pivot axis, each support means including a rod for receiving movable heavy discs for adding bias pressure to said rollers against the ground.

12. A machine according to claim 4, wherein the ploughshare which makes the furrow in the earth comprises a V-shaped blade to form a concave recess adjacent opposite surfaces thereof.

13. A machine according to claim 4, including watering means on the framework for dispensing water in the ground from an outlet positioned beneath the plastic sheet adjacent a level with the ploughshare.

14. A machine according to claim 1, wherein the means for perforating the sheet comprises a movable hollow punch co-operating with a sheet support member supported on the framework and above the ploughshare.

15. A machine according to claim 14, wherein the hollow punch is secured to the end of a pivoting arm cooperating with a cam driven by the supporting wheels.

16. A machine according to claim 15, including a hook engageable to lift and then release the pivoting lever of the hollow punch, said hook including drive means interconnected with the supporting wheels for lifting and releasing the lever.

17. A machine according to claim 16, wherein said drive means includes a shaft on said framework movable axially against a return-spring and supporting the hook, and a cam mounted on a disc driven by the supporting wheels for axially moving said shaft to release said lever.

* * * * *